(12) United States Patent
Zhang et al.

(10) Patent No.: US 11,435,519 B2
(45) Date of Patent: *Sep. 6, 2022

(54) LOW-DISPERSION SINGLE-MODE OPTICAL FIBER

(71) Applicant: YANGTZE OPTICAL FIBRE AND CABLE JOINT STOCK LIMITED COMPANY, Hubei (CN)

(72) Inventors: Lei Zhang, Hubei (CN); Ruichun Wang, Hubei (CN); Rui Zhang, Hubei (CN); Chao Wu, Hubei (CN); Lan Deng, Hubei (CN); Hongyan Zhou, Hubei (CN); Lei Shen, Hubei (CN); Jie Luo, Hubei (CN)

(73) Assignee: YANGTZE OPTICAL FIBRE AND CABLE JOINT STOCK LIMITED COMPANY, Hubei (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/420,232

(22) PCT Filed: Oct. 20, 2020

(86) PCT No.: PCT/CN2020/122057
§ 371 (c)(1),
(2) Date: Jul. 1, 2021

(87) PCT Pub. No.: WO2021/082979
PCT Pub. Date: May 6, 2021

(65) Prior Publication Data
US 2022/0091328 A1    Mar. 24, 2022

(30) Foreign Application Priority Data
Oct. 29, 2019 (CN) .......................... 201911038440.5

(51) Int. Cl.
*G02B 6/02* (2006.01)
*G02B 6/036* (2006.01)

(52) U.S. Cl.
CPC ...... *G02B 6/02214* (2013.01); *G02B 6/03611* (2013.01); *G02B 6/03666* (2013.01)

(58) Field of Classification Search
None
See application file for complete search history.

(56) References Cited

U.S. PATENT DOCUMENTS

2010/0189400 A1* 7/2010 Sillard ............... G02B 6/03644
385/127
2013/0272670 A1* 10/2013 Frigerio ............ C03B 37/01257
385/126

(Continued)

FOREIGN PATENT DOCUMENTS

CN    1664635 A      7/2005
CN    1252498 C  *  4/2006

(Continued)

OTHER PUBLICATIONS

State Intellectual Property Office of People's Republic of China, "International Search Report for PCT Application No. PCT/CN2020/122057", China, dated Jan. 19, 2021.

*Primary Examiner* — Chad H Smith
(74) *Attorney, Agent, or Firm* — Tim Tingkang Xia, Esq.; Locke Lord LLP

(57) ABSTRACT

A low-dispersion single-mode optical fiber includes a core and a cladding covering the core. The core has a relative refractive index difference of 0.30-0.65% and a radius of 2.5-4.5 μm. The cladding layer including first, second, third cladding layers and an outer cladding arranged sequentially from inside to outside. The first cladding layer covers the core, and has a relative refractive index difference of −0.70% to −0.30% and a radius of 4.5-7.5 μm. The second cladding (Continued)

layer covers the first cladding layer, and has a relative refractive index difference of −0.20% to 0.25% and a radius of 7.0-12.0 μm. The third cladding layer covers the second cladding layer, and has a relative refractive index difference of −0.60% to 0.00% and a radius of 10.0-20.0 μm. The outer cladding covers the third cladding layer, and is a layer made of pure silicon dioxide glass.

9 Claims, 3 Drawing Sheets

(56) References Cited

U.S. PATENT DOCUMENTS

2018/0321438 A1 11/2018 Bookbinder et al.
2022/0050244 A1* 2/2022 Yan .................... G02B 6/03666

FOREIGN PATENT DOCUMENTS

| CN | 101169497 A | 4/2008 |
| CN | 100510811 C | 7/2009 |
| CN | 103217736 A | 7/2013 |
| CN | 103257397 A | 8/2013 |
| CN | 103380389 A | 10/2013 |
| CN | 107678087 A | 2/2018 |
| CN | 110749953 A | 2/2020 |

* cited by examiner

LOW-DISPERSION SINGLE-MODE OPTICAL FIBER

FIELD OF THE INVENTION

The present disclosure relates generally to a single-mode fiber for an optical fiber communication system, and more particularly to a dispersion-adjusted low-dispersion single-mode fiber. This single-mode fiber has relatively low dispersion in a relatively large wavelength range, can solve system transmission performance problems caused by dispersion, and is particularly suitable for a WDM transmission system working at a waveband ranging from 1260 nm to 1460 nm.

BACKGROUND OF THE INVENTION

In an optical fiber communication system, accumulation of dispersion present in single-mode fibers during transmission would cause deformation of signal pulses, thereby increasing the dispersion penalty and increasing the bit error rate. Thus, due to relatively large dispersion in the fibers, there are high standards for an optical module in a transmission system, and it is often necessary to add a cooler to the optical module or replace an existing detector with a more sensitive detector. Meanwhile, dispersion is also a factor that limits the transmission distance. In order to correct influence of dispersion on transmission performance, when conventional fibers are used for transmission, a post-dispersion compensation (PDC) module may be arranged at a receiving end to restore a waveform. However, adding a dispersion compensation module would increase complexity of the system and require a special space for the arrangement, thereby increasing the workload of laying and maintenance. In order to reduce the influence of dispersion on the transmission performance, simplify design of dispersion compensation for the system, reduce the overall cost of the system, and extend the transmission distance of the system, a new type of dispersion-optimized single-mode fiber with a relatively small dispersion value in a wide waveband range may be developed. The focus of the current commercial dispersion-shifted single-mode fibers and non-zero dispersion-shifted single-mode fibers and existing patents about dispersion-flattened fibers lies mostly on dispersion optimization at a waveband ranging from 1530 nm to 1565 nm, but not on that at a waveband of ranging from 1260 nm to 1460 nm.

Chinese patent CN200610117423.7 describes a full-wave nonzero dispersion flattened single-mode fiber, which includes a central core layer, two annular cladding layers, and an outer cladding. Although the dispersion value of the fiber at a waveband ranging from 1300 nm to 1625 nm is disclosed, the cutoff wavelength value is not mentioned. Refractive index differences of the core layer and a first annular layer and a core radius are all relatively large, and thus it can be expected that the cutoff wavelength is relatively large. It is found, by calculation, that high-order modes exist in its whole waveband, i.e., from 1300 nm to 1625 nm, and thus the fiber cannot be applied to a single-mode fiber transmission system. This patent only discloses parameters of the dispersion and the effective area, and does not disclose attenuation characteristics of the fiber. Besides, a second annular layer of the fiber has a relatively high refractive index difference, but no depressed layer is provided outside the annular layer. This structure cannot balance between the effective area and the bending performance, and the bending performance deteriorated while the effective area is increased.

Chinese patent CN1664635A describes a dispersion-flattened single-mode fiber with positive dispersion, which is a fiber with a three-cladding structure having an alpha profile. Structure parameters of the fiber can realize dispersion flattening at a waveband ranging from 1460 nm to 1625 nm, but this patent neither mentions characteristic parameters of the fiber at a shorter wavelength waveband ranging from 1260 nm to 1460 nm nor discloses attenuation characteristics of the fiber. It can be seen from the embodiment that the cutoff wavelength has a relatively high upper limit, and thus it is known that it cannot be ensured that the fiber can realize single-mode transmission at the whole waveband ranging from 1260 nm to 1460 nm. Chinese patent CN100510811C describes a non-zero dispersion-shifted fiber having low zero dispersion, which is also a fiber with a three-cladding structure having an alpha profile. A first annular region layer has a relative refractive index which is larger than or equal to zero, and this would cause a relatively small difference value between a refractive index difference of the core and a refractive index difference of the cladding. Moreover, no depressed cladding is provided outside the annular layer to prevent leakage of fiber signals. This structure exhibits unsatisfactory bending performance, and would cause increasing of fiber attenuation during actual use and operation. This patent focuses on optimizing dispersion at a waveband ranging from 1525 nm to 1625 nm, and an absolute value of dispersion at a wavelength of 1310 nm is very large.

To sum up, most of the current dispersion-optimized fibers have a cable cutoff wavelength of greater than 1260 nm. Focus of attention is given mainly to the transmission and dispersion optimization at a C+L waveband (1530 nm-1625 nm) (thus only fiber characteristics at this waveband are given), and no attention is paid to an O+E waveband (1260 nm-1460 nm). Ordinary single-mode G.652.D fibers have a relatively large dispersion slope and long-wavelength dispersion at the waveband ranging from 1260 nm to 1460 nm, which leads to low sensitivity of the system and relatively large dispersion power penalty; and the longer the transmission distance is, the more serious the influence on the system is. In order to improve the transmission performance of the single-mode fiber in the WDM system working at the waveband ranging from 1260 nm to 1460 nm, reduce the dispersion power penalty, and reduce the overall cost of the system, it is of great significance to develop a new type of dispersion-optimized single-mode fiber. The dispersion of the single-mode fiber includes material dispersion and waveguide dispersion. Material dispersion is caused by the nonlinear change of the refractive index with the wavelength, and is only associated with the composition of the material. Material dispersion can be changed slightly by adding certain dopants, but can only be adjusted by a relatively small amount as long as silicon oxide is used as the raw material of the fiber. Waveguide dispersion is an important part of the fiber dispersion, and it depends on the waveguide structure. By reasonably designing a refractive index profile, the waveguide dispersion can be adjusted, so that the total dispersion of the fiber can be flexibly adjusted to meet actual application requirements.

SUMMARY OF THE INVENTION

To facilitate description of the present disclosure, some terms used in this text are defined as follows.

Optical preform: a glass rod or a fabricate block that is composed of a core layer and a cladding, has a radial refractive index distribution meeting fiber design requirements, and can be directly drawn into the designed fiber.

Core rod: a solid-glass preformed member including a core layer and part of a cladding.

Radius: a distance from an outer edge of a layer to a center point of the layer.

Refractive index profile: reflecting a relationship between a glass refractive index of a fiber or a fiber preformed rod (including the core rod) and a Radius thereof.

Relative refractive index difference $\Delta$:

$$\Delta = [(n_i^2 - n_0^2)/2n_i^2] \times 100\% \approx \frac{n_i - n_0}{n_0} \times 100\%$$

where $n_i$ is a refractive index of a corresponding part of the fiber and no is a refractive index of an outer cladding made of pure silicon dioxide glass.

OVD deposition process: in which outside vapor deposition is used to prepare $SiO_2$ glass with a desired thickness.

VAD deposition process: in which axial vapor deposition is used to prepare $SiO_2$ glass with a desired thickness.

APCVD deposition process: in which a high-frequency plasma flame is used to melt and condense natural or synthetic quartz powder into $SiO_2$ glass with a desired thickness.

PCVD deposition process: in which a microwave plasma chemical vapor deposition process is used to prepare $SiO_2$ glass with a desired thickness.

MPCVD deposition process: in which a modified plasma chemical vapor deposition process is used to prepare $SiO_2$ glass with a desired thickness.

Total dispersion of a single-mode fiber: which refers to the algebraic sum of material dispersion and waveguide dispersion of a fiber; intermodal dispersion of a single-mode fiber is zero; the material dispersion is only associated with composition of a material, while the waveguide dispersion is dependent on a radius of a fiber core, a refractive index difference, and a shape of a refractive index profile.

Method for measuring macro bending induced loss: please refer to the method as specified in IEC-60793-1-47.

Directed against the above deficiency in the existing technologies, the present disclosure aims to provide a low-dispersion single-mode fiber, which has a cable cutoff wavelength smaller than 1260 nm, relatively low dispersion at a waveband ranging from 1260 nm to 1460 nm on the whole, and good attenuation performance.

In order to achieve the above objective, the present disclosure adopts the following technical solutions. The low-dispersion single-mode fiber includes a core layer and a cladding. The core layer has a relative refractive index difference $\Delta 1$ in a range from 0.30% to 0.65% and a radius R1 in a range from 2.5 μm to 4.5 μm. The cladding is divided into three cladding layers and one outer cladding from inside to outside. A first cladding layer covers the core layer, and has a relative refractive index difference $\Delta 2$ in a range from −0.70% to −0.30% and a radius R2 in a range from 4.5 μm to 7.5 μm. A second cladding layer covers the first cladding layer, and has a relative refractive index difference $\Delta 3$ in a range from −0.20% to 0.25% and a radius R3 in a range from 7.0 μm to 12.0 μm. A third cladding layer covers the second cladding layer, and has a relative refractive index difference $\Delta 4$ in a range from −0.60% to 0.00% and a radius R4 in a range from 10.0 μm to 20.0 μm. The outer cladding covers the third cladding layer, and is a layer made of pure silicon dioxide glass.

According to the above solution, the core layer is provided with an inner core layer which is depressed at a central portion thereof and having a relative refractive index difference $\Delta 0$ in a range from 0.10% to 0.55% and a radius R0 in a range from 1.0 μm to 2.5 μm.

According to the above solution, the fiber has a cable cutoff wavelength smaller than 1260 nm.

According to the above solution, the fiber has a dispersion coefficient in a range from 0.0 ps/nm/km to −18 ps/nm/km at a wavelength of 1260 nm.

According to the above solution, the fiber has a dispersion coefficient smaller than or equal to 3.5 ps/nm/km at a wavelength of 1380 nm.

According to the above solution, the fiber has a dispersion coefficient smaller than or equal to 10.0 ps/nm/km at a wavelength of 1460 nm.

According to the above solution, the fiber has attenuation smaller than or equal to 0.80 dB/km at a waveband ranging from 1260 nm to 1460 nm, and preferably the attenuation of the fiber is smaller than or equal to 0.60 dB/km.

According to the above solution, the fiber has a bending loss smaller than 0.1 dB when bent into 100 circles with a diameter of 60 mm at a wavelength of 1625 nm; and more preferably, the fiber has a bending loss smaller than 0.25 dB and a bending loss smaller than 1 dB respectively when bent into 10 circles with a diameter of 30 mm at a wavelength of 1550 nm and at a wavelength of 1625 nm, and the fiber has a bending loss smaller than 0.75 dB and a bending loss smaller than 1.5 dB respectively when bent into 1 circle with a diameter of 20 mm at a wavelength of 1550 nm and at a wavelength of 1625 nm.

According to the above solution, use of the fiber in the present disclosure as a low-dispersion single-mode fiber in a communication system is provided, and the fiber is used for a WDM transmission system working at a waveband ranging from 1260 nm to 1460 nm.

The beneficial effects of the present disclosure lie in the following aspects. 1. By adjusting a refractive index profile of the fiber and configuring a low refractive index and a reasonable radius for the first cladding layer and a reasonable refractive index for the second cladding layer, a waveguide dispersion value of the fiber is reduced, so that total dispersion (the sum of waveband dispersion and material dispersion) of the fiber is reduced. In particular, a single-mode fiber with low dispersion at a waveband ranging from 1260 nm to 1460 nm, which has a dispersion coefficient lower than that of a conventional G.652.D fiber but higher than that of a non-zero dispersion-shifted single-mode fiber, is obtained. This fiber can significantly reduce the dispersion power compensation penalty, reduce requirements for an optical module, save the overall cost of a system, and meet the application needs for high-performance but low-cost system transmission. (2) By reasonably configuring a refractive index and a radius of the core layer and a refractive index of the second cladding layer, the fiber is enabled to have a cutoff wavelength smaller than 1260 nm and good attenuation at the waveband ranging from 1260 nm to 460 nm on the whole, which can meet the needs for long-distance system transmission. (3) The low-dispersion single-mode fiber is provided inside the outer cladding with a depressed cladding structure, which prevents leakage of optical signals in a bending state, reduces bending losses, and enhances reliability of the fiber used in complex situations. (4) While meeting the requirements for various properties, the fiber is designed to have a refractive index profile with three cladding layers, which simplifies the manufacturing of the fiber, realizes low manufacturing cost, and thus allows large-scale production and application of the fiber.

DETAILED DESCRIPTION OF THE EMBODIMENTS

Embodiments are provided below in detail to further supplement and describe the present disclosure.

Figure 1:
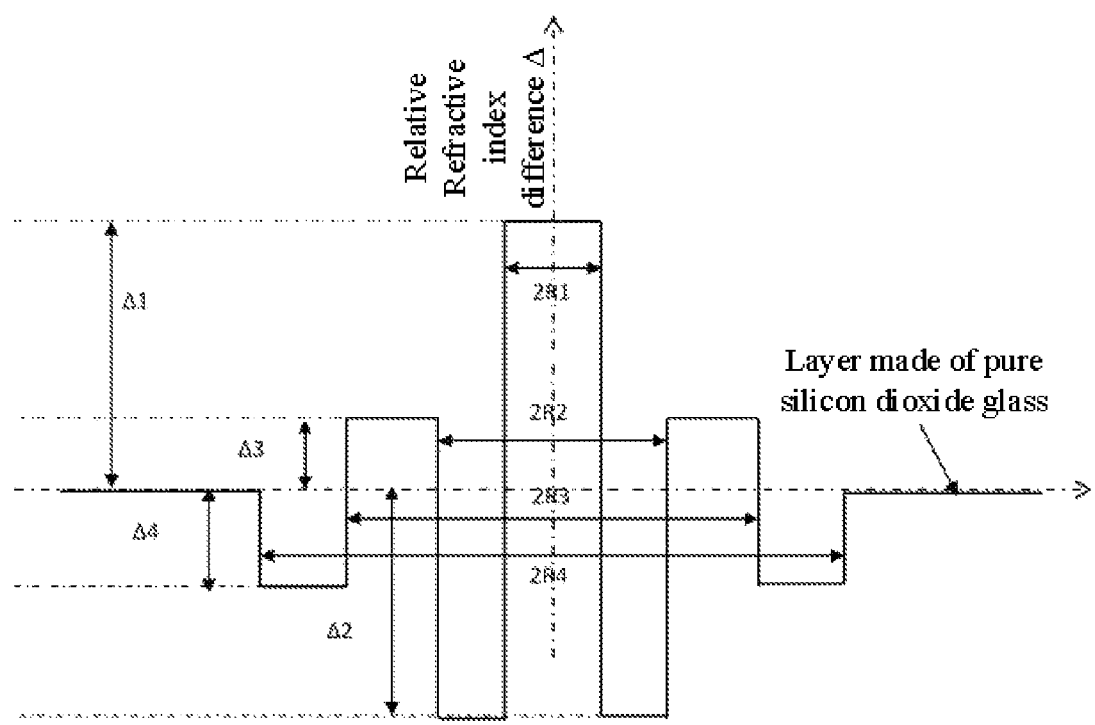
FIG. 1 schematically shows a refractive index profile of a fiber in Embodiment 1 of the present disclosure.

Embodiment 1 of the present disclosure is shown in FIG. 1. A fiber includes a core layer and a cladding. The core layer has a relative refractive index difference $\Delta 1$ and a radius $R1$. The cladding is divided into three cladding layers and one outer cladding from inside to outside. A first cladding layer covers the core layer, and has a relative refractive index difference $\Delta 2$ and a radius $R2$. A second cladding layer covers the first cladding layer, and has a relative refractive index difference $\Delta 3$ and a radius $R3$. A third cladding layer covers the second cladding layer, and has a relative refractive index difference $\Delta 4$ and a radius $R4$. The outer cladding covers the third cladding layer, and is a layer made of pure silicon dioxide glass.

Table 1 shows structural parameters designed for a refractive index profile of the fiber, and Table 2 shows properties of the fiber with the designed structural parameters.

TABLE 1

Structural parameters designed for a refractive index profile of the fiber.

| Parameters | Embodiment 1 | Embodiment 2 | Embodiment 3 | Embodiment 4 | Embodiment 5 |
| --- | --- | --- | --- | --- | --- |
| Radius of the core layer R1 (μm) | 2.7 | 3.3 | 4.5 | 3.0 | 3.1 |
| Relative refractive index of the core layer Δ1 | 0.65% | 0.45% | 0.30% | 0.52% | 0.54% |
| Radius of the first cladding layer R2 (μm) | 4.7 | 5.5 | 7.0 | 6.0 | 5.6 |
| Relative refractive index of the first cladding layer Δ2 | −0.60% | −0.70% | −0.30% | −0.55% | −0.42% |
| Radius of the second cladding layer R3 (μm) | 7.0 | 12.0 | 9.0 | 10.5 | 10.0 |
| Relative refractive index of the second cladding layer Δ3 | −0.20% | 0.00% | 0.25% | 0.08% | 0.14% |
| Radius of the third cladding layer R4 (μm) | 10.0 | 20.0 | 18.0 | 12.5 | 14.0 |
| Relative refractive index of the third cladding layer Δ4 | −0.40% | −0.60% | 0 | −0.10% | −0.10% |

TABLE 2

Properties of the fiber with the designed structural parameters.

| Indexes | Embodiment 1 | Embodiment 2 | Embodiment 3 | Embodiment 4 | Embodiment 5 |
| --- | --- | --- | --- | --- | --- |
| Cable cutoff wavelength/nm | 1245 | 1230 | 1195 | 1210 | 1255 |
| Attenuation @1260 nm | 0.450 | 0.423 | 0.430 | 0.463 | 0.453 |
| Attenuation @1380 nm | 0.700 | 0.602 | 0.550 | 0.720 | 0.430 |
| Attenuation @1460 nm | 0.265 | 0.255 | 0.245 | 0.245 | 0.242 |
| Dispersion coefficient @1260 nm | −5.2 | −3.7 | −7.0 | −5.1 | −7.7 |
| Dispersion coefficient @1380 nm | 2.2 | 3.2 | 1.3 | 1.6 | −2.4 |
| Dispersion coefficient @1460 nm | 5.6 | 5.8 | 5.5 | 2.5 | −0.9 |
| Bending loss when the fiber is bent into 100 circles with a diameter of 60 mm @1625 nm | 0.010 | 0.015 | 0.075 | 0.085 | 0.080 |

TABLE 2-continued

Properties of the fiber with the designed structural parameters.

| Indexes | Embodiment 1 | Embodiment 2 | Embodiment 3 | Embodiment 4 | Embodiment 5 |
|---|---|---|---|---|---|
| Bending loss when the fiber is bent into 10 circles with a diameter of 30 mm @1550 nm | 0.025 | 0.030 | 0.105 | 0.055 | 0.032 |
| Bending loss when the fiber is bent into 10 circles with a diameter of 30 mm @1625 nm | 0.088 | 0.099 | 0.350 | 0.170 | 0.125 |
| Bending loss when the fiber is bent into 1 circle with a diameter of 20 mm @1550 nm | 0.160 | 0.075 | 0.950 | 0.255 | 0.144 |
| Bending loss when the fiber is bent into 1 circle with a diameter of 20 mm @1625 nm | 0.855 | 0.532 | 1.600 | 0.955 | 0..642 |

Figure 2:
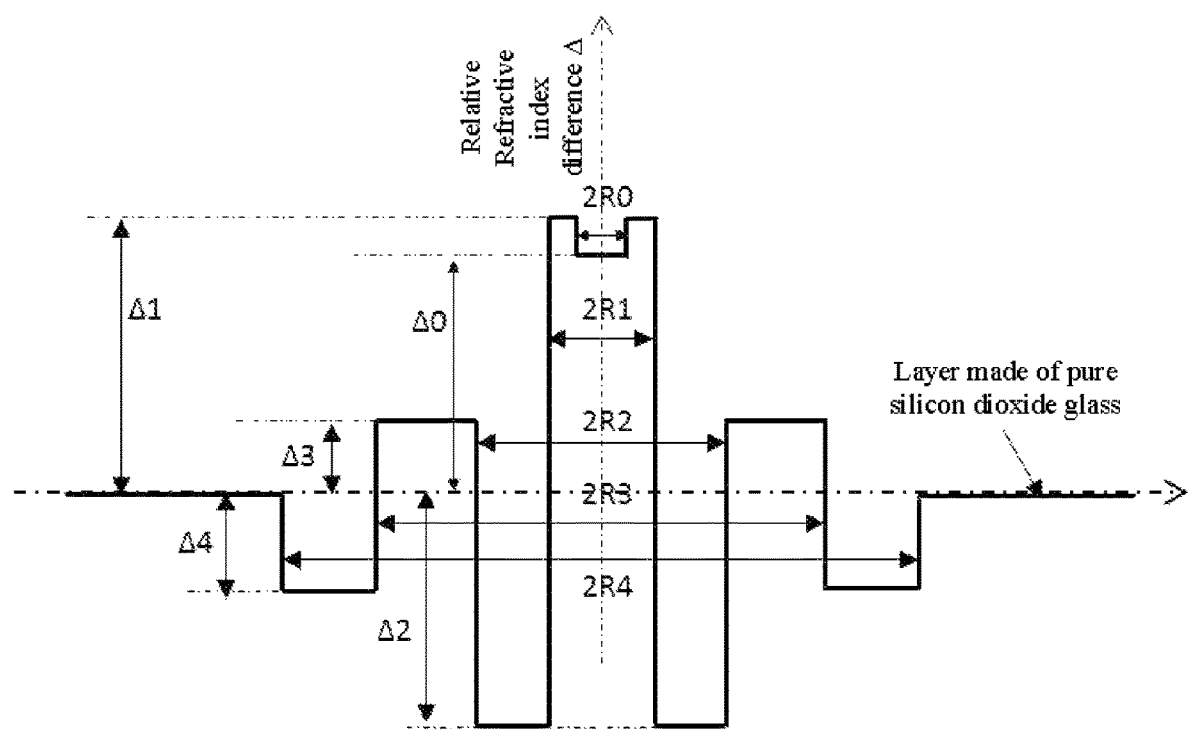
FIG. 2 schematically shows a refractive index profile of a fiber in Embodiment 2 of the present disclosure.
Figure 3:
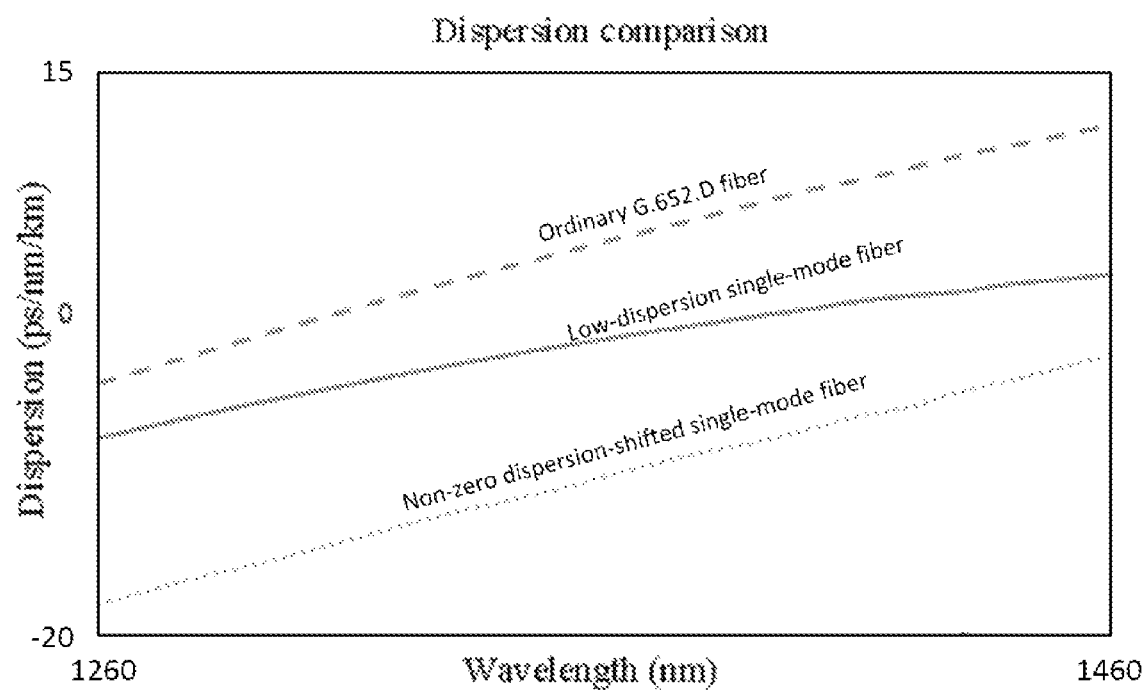
FIG. 3 shows a dispersion curve of a fiber in the present disclosure at a waveband ranging from 1260 nm to 1460 nm and comparisons of the dispersion curve of the fiber with those of an ordinary G.652.D fiber and a non-zero dispersion-shifted single-mode fiber.

Embodiment 2 of the present disclosure is shown in FIG. 2. Embodiment 2 differs from Embodiment 1 only in that, the core layer is provided with an inner core layer. The inner core layer is depressed at a central portion thereof and has a relative refractive index difference $\Delta 0$ and a radius $R0$. Other structures in Embodiment 2 are the same as those in Embodiment 1. By disposing the centrally depressed layer in the core layer of the fiber, an energy distribution inside the fiber is changed from a typical Gaussian distribution to a non-Gaussian distribution, which can ensure a proper increase to a diameter of a mode field of the fiber when a cutoff wavelength is smaller than 1260 nm.

Table 3 shows structural parameters designed for a refractive index profile of the fiber, and Table 4 shows properties of the fiber under the designed structural parameters.

TABLE 3

Structural parameters designed for a refractive index profile of the fiber.

| Parameters | Embodiment 1 | Embodiment 2 | Embodiment 3 | Embodiment 4 | Embodiment 5 |
|---|---|---|---|---|---|
| Radius of the depressed core layer R0 (μm) | 1.0 | 1.5 | 2.5 | 1.0 | 1.1 |
| Relative refractive index of the depressed core layer $\Delta 0$ | 0.55% | 0.35% | 0.20% | 0.15% | 0.10% |
| Radius of the outer core layer R1 (μm) | 2.7 | 3.3 | 4.5 | 3.0 | 3.1 |
| Relative refractive index of the outer core layer $\Delta 1$ | 0.65% | 0.45% | 0.30% | 0.52% | 0.54% |
| Radius of the first cladding layer R2 (μm) | 4.7 | 5.5 | 7.0 | 6.0 | 5.6 |
| Relative refractive index of the first cladding layer $\Delta 2$ | −0.60% | −0.70% | −0.30% | −0.55% | −0.42% |
| Radius of the second cladding layer R3 (μm) | 7.0 | 12.0 | 9.0 | 10.5 | 10.0 |
| Relative refractive index of the second cladding layer $\Delta 3$ | −0.20% | 0.00% | 0.25% | 0.08% | 0.14% |
| Radius of the third cladding layer R4 (μm) | 10.0 | 20.0 | 18.0 | 12.5 | 14.0 |
| Relative refractive index of the third cladding layer $\Delta 4$ | −0.40% | −0.60% | 0 | −0.10% | −0.10% |

TABLE 4

Properties of the fiber under the designed structural parameters.

| Parameters | Embodiment 1 | Embodiment 2 | Embodiment 3 | Embodiment 4 | Embodiment 5 |
|---|---|---|---|---|---|
| Cable cutoff wavelength/nm | 1240 | 1210 | 1190 | 1215 | 1220 |
| Attenuation @1260 nm | 0.410 | 0.433 | 0.440 | 0.463 | 0.473 |
| Attenuation @1380 nm | 0.800 | 0.607 | 0.450 | 0.500 | 0.530 |
| Attenuation @1460 nm | 0.278 | 0.245 | 0.265 | 0.246 | 0.233 |
| Dispersion coefficient @1260 nm | −5.4 | −6.9 | −10.0 | −7.4 | −14.0 |
| Dispersion coefficient @1380 nm | 2.1 | 3.0 | −1.6 | −0.9 | −11.0 |
| Dispersion coefficient @1460 nm | 5.5 | 5.4 | 3.1 | 0.4 | −10.5 |
| Bending loss when the fiber is bent into 100 circles with a diameter of 60 mm @1625 nm | 0.025 | 0.040 | 0.095 | 0.090 | 0.070 |
| Bending loss when the fiber is bent into 10 circles with a diameter of 30 mm @1550 nm | 0.045 | 0.050 | 0.220 | 0.085 | 0.152 |
| Bending loss when the fiber is bent into 10 circles with a diameter of 30 mm @1625 nm | 0.108 | 0.119 | 0.850 | 0.370 | 0.325 |
| Bending loss when the fiber is bent into 1 circle with a diameter of 20 mm @1550 nm | 0.360 | 0.065 | 0.950 | 0.355 | 0.144 |
| Bending loss when the fiber is bent into 1 circle with a diameter of 20 mm @1625 nm | 1.055 | 0.632 | 1.700 | 0.955 | 0..742 |

What is claimed is:

1. A low-dispersion single-mode fiber, comprising:
a core layer and a cladding,
wherein the core layer has a relative refractive index difference $\Delta 1$ in a range from 0.30% to 0.65% and a radius R1 in a range from 2.5 μm to 4.5 μm, and
wherein the cladding is divided into three cladding layers and one outer cladding from inside to outside, wherein a first cladding layer covers the core layer, and has a relative refractive index difference $\Delta 2$ in a range from −0.70% to −0.30% and a radius R2 in a range from 4.5 μm to 7.5 μm; a second cladding layer covers the first cladding layer, and has a relative refractive index difference $\Delta 3$ in a range from −0.20% to 0.25% and a radius R3 in a range from 7.0 μm to 12.0 μm; a third cladding layer covers the second cladding layer, and has a relative refractive index difference $\Delta 4$ in a range from −0.60% to 0.00% and a radius R4 in a range from 10.0 μm to 20.0 μm; and the outer cladding covers the third cladding layer, and is a layer made of pure silicon dioxide glass wherein the core layer is provided with an inner core layer, wherein the inner core layer is depressed at a central portion thereof and has a relative refractive index difference $\Delta 0$ in a range from 0.10% to 0.55% and a radius $\Delta 0$ in arrange from 1.0 μm to 2.5 μm.

2. The low-dispersion single-mode fiber according to claim 1, wherein the fiber has a cable cutoff wavelength smaller than 1260 nm.

3. The low-dispersion single-mode fiber according to claim 1, wherein the fiber has a dispersion coefficient in a range from 0.0 ps/nm/km to −18 ps/nm/km at a wavelength of 1260 nm.

4. The low-dispersion single-mode fiber according to claim 1, wherein the fiber has a dispersion coefficient smaller than or equal to 3.5 ps/nm/km at a wavelength of 1380 nm.

5. The low-dispersion single-mode fiber according to claim 1, wherein the fiber has a dispersion coefficient smaller than or equal to 10.0 ps/nm/km at a wavelength of 1460 nm.

6. The low-dispersion single-mode fiber according to claim 1, wherein the fiber has attenuation smaller than or equal to 0.80 dB/km at a waveband ranging from 1260 nm to 1460 nm.

7. The low-dispersion single-mode fiber according to claim 1, wherein the fiber has a bending loss smaller than 0.1 dB when bent into 100 circles with a diameter of 60 mm at a wavelength of 1625 nm.

8. The low-dispersion single-mode fiber according to claim 1, wherein the fiber has a bending loss smaller than 0.25 dB and a bending loss smaller than 1 dB respectively when bent into 10 circles with a diameter of 30 mm at a wavelength of 1550 nm and at a wavelength of 1625 nm, and the fiber has a bending loss smaller than 0.75 dB and a bending loss smaller than 1.5 dB respectively when bent into 1 circle with a diameter of 20 mm at a wavelength of 1550 nm and at a wavelength of 1625 nm.

9. Use of the fiber according to claim 1 as a low-dispersion single-mode fiber in a communication system, wherein the fiber is used for a WDM transmission system working at a waveband ranging from 1260 nm to 1460 nm.

* * * * *